(12) United States Patent
Seol

(10) Patent No.: US 10,202,107 B2
(45) Date of Patent: Feb. 12, 2019

(54) BRAKE SYSTEM FOR AUTOMOBILE

(71) Applicant: HYUNDAI MOBIS Co., Ltd., Yongin-si (KR)

(72) Inventor: Yong cheol Seol, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 14/996,296

(22) Filed: Jan. 15, 2016

(65) Prior Publication Data

US 2016/0214589 A1 Jul. 28, 2016

(30) Foreign Application Priority Data

Jan. 22, 2015 (KR) ........................ 10-2015-0010774

(51) Int. Cl.
*B60T 8/48* (2006.01)
*B60T 8/40* (2006.01)

(52) U.S. Cl.
CPC ......... *B60T 8/4081* (2013.01); *B60T 2270/82* (2013.01)

(58) Field of Classification Search
CPC .......... B60T 8/4827; B60T 8/17; B60T 8/176; B60T 8/341; B60T 2270/82; B60T 13/66
USPC ............................ 303/114.1, 114.2
See application file for complete search history.

(56) References Cited

U.S. PATENT DOCUMENTS

| | | | | |
|---|---|---|---|---|
| 4,805,966 A * | 2/1989 | Reinartz | ............... | B60T 13/146 303/114.1 |
| 7,988,241 B2 * | 8/2011 | Ishii | ........................ | B60T 7/042 303/11 |
| 8,496,301 B2 * | 7/2013 | Ohkubo | .................. | B60T 7/042 303/113.4 |
| 8,827,377 B2 * | 9/2014 | Nishioka | ................. | B60T 7/042 303/10 |
| 2002/0084693 A1 | 7/2002 | Isono et al. | | |

FOREIGN PATENT DOCUMENTS

| | | |
|---|---|---|
| CN | 1374218 | 10/2002 |
| CN | 203864681 | 10/2014 |

OTHER PUBLICATIONS

The Chinese Office Action dated Nov. 17, 2017, issued in a Chinese Patent Application No. 201610040237.1 (with unverified English translation).

* cited by examiner

*Primary Examiner* — Xuan Lan Nguyen
(74) *Attorney, Agent, or Firm* — H.C. Park & Associates, PLC

(57) ABSTRACT

A brake system including a main body having a first main chamber and a second main chamber divided by a main piston, a motor configured to move the main piston forward and move the main piston rearward, a first traction control valve installed in a first flow path, a second traction control valve installed in a second flow path, and a controller configured to control the motor, the first traction control valve, and the second traction control valve. When an anti-lock brake system (ABS) starting pressure is lower than an ABS critical value, the controller performs a low-pressure forward movement connection control that closes the first traction control valve and the second traction control valve, and moves the main piston forward to increase a first hydraulic pressure in the second main chamber.

10 Claims, 5 Drawing Sheets

BRAKE SYSTEM FOR AUTOMOBILE

CROSS-REFERENCE TO RELATED APPLICATIONS

The present application claims priority from and the benefit of Korean Patent Application No. 10-2015-0010774, filed Jan. 22, 2015, which is hereby incorporated by reference for all purposes as if fully set forth herein.

BACKGROUND

Field

The present disclosure relates to a brake system for an automobile, and more particularly, to a brake system for an automobile for braking wheels by using hydraulic pressure.

In general, an electronic hydraulic brake apparatus detects pedal pressure caused by a driver by using a sensor, and thereafter, adjusts braking pressure applied to each wheel by using a hydraulic modulator.

The electronic hydraulic brake apparatus is provided with a sensor which detects a stroke of a pedal so as to recognize braking pressure desired by the driver, and a pedal simulator which allows the driver to feel pedal pressure that the driver may feel from a general hydraulic brake apparatus.

In a normal state, when the driver presses a brake pedal, pressure is generated by a back-up master cylinder, and the pressure generated by the back-up master cylinder is transmitted to the pedal simulator, thereby allowing the driver to feel reaction force.

A control unit determines braking force desired by the driver by using a pedal stroke sensor, a pressure sensor or the like, and operates a main master cylinder to cause a wheel brake to generate braking force.

The above information disclosed in this Background section is only for enhancement of understanding of the background of the inventive concept, and, therefore, it may contain information that does not form the prior art that is already known in this country to a person of ordinary skill in the art.

SUMMARY

The present disclosure provides a brake system for an automobile, which reduces the number of changes in direction of a main piston included in a main master cylinder when an anti-lock brake system (ABS) is operated, thereby improving ABS efficiency and durability of the main master cylinder, and reducing operational noise.

Additional aspects will be set forth in the detailed description which follows, and, in part, will be apparent from the disclosure, or may be learned by practice of the inventive concept.

An exemplary embodiment of the present disclosure provides a brake system for an automobile including a main body having an internal space divided by a main piston into a first main chamber and a second main chamber having a greater effective cross section than the first main chamber, a motor configured to move the main piston forward such that the first main chamber is widened while the second main chamber is narrowed and move the main piston rearward such that the first main chamber is narrowed while the second main chamber is widened, a first traction control valve installed in a first flow path through which a first hydraulic pressure in the second main chamber is supplied to wheel brakes, a second traction control valve installed in a second flow path through which a second hydraulic pressure in the first main chamber is supplied to the wheel brakes, and a controller configured to control the motor, the first traction control valve, and the second traction control valve. When an anti-lock brake system (ABS) starting pressure is lower than an ABS critical value, the controller performs a low-pressure forward movement connection control that closes the first traction control valve and the second traction control valve, and moves the main piston forward to increase the first hydraulic pressure in the second main chamber, and the ABS starting pressure is the pressure of the wheel brakes when an ABS is started.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
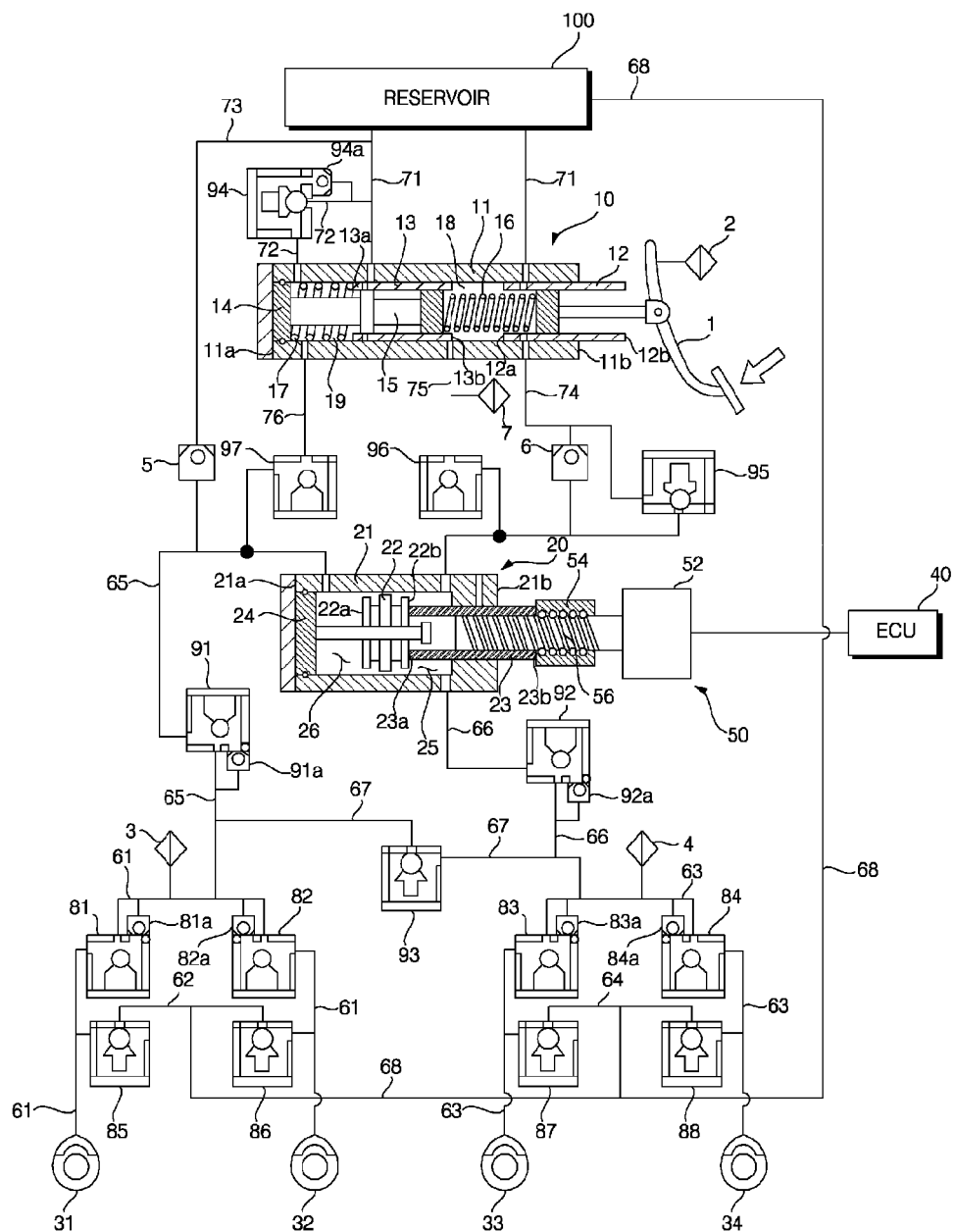
FIG. 1 is a view illustrating a brake system for an automobile according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the drawings, the size and relative sizes of regions and components may be exaggerated for clarity. Like numerals denote like elements.

When an element is referred to as being "on," "connected to," or "positioned on" another element, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a brake system for an automobile according to an exemplary embodiment of the present invention will described with reference to the drawings.

FIG. 1 is a view illustrating a brake system for an automobile according to an exemplary embodiment.

Referring to FIG. 1, a brake system for an automobile according to an exemplary embodiment includes a back-up master cylinder 10, a main master cylinder 20, and wheel brakes 31, 32, 33, and 34.

The back-up master cylinder 10 may include a back-up body 11, a first back-up piston 12, a second back-up piston 13, a back-up stopper 14, a reaction force damper 15, a first elastic member 16, and a second elastic member 17.

The back-up body 11 may be formed to have a structure with a vacant internal space. The first back-up piston 12 and the second back-up piston 13 may be disposed in the internal space of the back-up body 11 so as to be rectilinearly moved (i.e., move in the left and right directions when looking at FIG. 1). The internal space of the back-up body 11 may be divided into a first back-up chamber 18, which is a space positioned between the first back-up piston 12 and the second back-up piston 13, and a second back-up chamber 19, which is a space positioned between the second back-up piston 13 and the back-up stopper 14.

The back-up body 11 may be opened at a first end 11a and a second end 11b. A first end 12a of the first back-up piston 12 may be inserted and disposed into the opened second end 11b of the back-up body 11, such that the opened second end 11b of the back-up body 11 may be closed by the first back-up piston 12. A second end 12b of the first back-up piston 12, opposite the first end 12a of the back-up piston 12, may be disposed to protrude from the second end 10b of the back-up body 11. A brake pedal 1 may be connected to the protruding second end 12b of the first back-up piston 12. A stroke sensor 2, which detects a stroke of the brake pedal 1 when a driver presses the brake pedal 1, may be disposed on the brake pedal 1. The first back-up piston 12 may be installed to be rectilinearly movable and in a state in which the first back-up piston 12 may be in close contact with an inner wall of the back-up body 11.

A second end 14b of the back-up stopper 14 may be inserted and disposed into the opened first end 11a of the back-up body 11, such that the opened first end 10a of the back-up body 11 may be closed by the back-up stopper 14. A first end of the back-up stopper 14 may be exposed outside from the back-up body 11. The first end of the back-up stopper 14 may be flush with and/or protrude from the first end 11a of the back-up body 11. The first end 11a of back-up body 11 may protrude away from the first end 14a of the back-up stopper 14 opposite from the second end 11b of the back-up body 11.

The second back-up piston 13 may be installed in the internal space in the back-up body 11 so as to be rectilinearly movable and in a state in which the second back-up piston 13 may be in close contact with the inner wall of the back-up body 11. The second back-up piston 13 may be disposed to be spaced apart from the first back-up piston 12 and the back-up stopper 14. The first elastic member 16 may be disposed between the first back-up piston 12 and the second back-up piston 13, which are spaced apart from each other. The first elastic member 16 may be formed as a spring, such that a second end of the first elastic member 16 elastically supports the first back-up piston 12, and the first end of the first elastic member 16 elastically supports the second back-up piston 13. The second elastic member 17 may be disposed between the second back-up piston 13 and the back-up stopper 14 which are spaced apart from each other. The second elastic member 17 may be formed as a spring, such that a second end of the second elastic member 17 elastically supports the second back-up piston 13, and the first end of the second elastic member 17 elastically supports the back-up stopper 14.

The second back-up piston 13 may be formed to have a structure with a vacant internal space, and the second back-up piston 13 may be closed at a second end 13b directed toward the first back-up piston 12, and opened at a first end 13a directed toward the back-up stopper 14.

The back-up stopper 14 may come in direct contact with the second elastic member 17, and a second end of the back-up stopper 14 may be inserted and disposed into the opened first end 13a of the second back-up piston 13.

The reaction force damper 15 may be disposed in the second back-up piston 13, a first end of the reaction force damper 15 may be supported by the second end of the back-up stopper 14, and a second end of the reaction force damper 15 may be supported by the first end 13a of the second back-up piston 13. When the second back-up piston 13 moves towards the back-up stopper 14, the reaction force damper 15 may be compressed to allow the driver to feel a reaction force when the driver presses the brake pedal 1. In an exemplary embodiment, the reaction force damper 15 is made of rubber, such that with the elastic properties of the rubber, the driver may feel a reaction force when the driver presses the brake pedal 1.

The main master cylinder 20 may be operated by a motor 52 controlled by a controller 40. The main master cylinder may generate and supply hydraulic pressure to the wheel brakes 31, 32, 33, and 34. In exemplary embodiments, the controller 40 is an electronic control unit (ECU). When the driver presses the brake pedal 1, the stroke sensor 2 may detect a stroke of the brake pedal 1 and may input a signal to the controller 40. The controller 40 may control the motor 52 based on the input signal from the stroke sensor 2. For example, the controller 40 may control the amount of hydraulic pressure generated by the main master cylinder 20 based on the input signal form the stroke sensor 2.

The main master cylinder 20 may include a main body 21, a main piston 22, a rod 23, and a main stopper 24.

The main body 21 may be formed to have a structure with a vacant internal space. The main piston 22 may be disposed in the internal space of the main body 21 so as to be rectilinearly movable. The internal space of the main body 21 may be divided into two spaces by the main piston 22. In particular, the internal space of the main body 21 may include a first main chamber 25, which may be a space disposed at a second end 22b of the main piston 22, and a second main chamber 26, which may be disposed at a first end 22a of the main piston 22.

When the main piston 22 moves forward, towards the main stopper 24, the first main chamber 25 may be widened and the second main chamber 26 may be narrowed. Analogously, when the main piston 22 moves rearward, away from the main stopper 24, the first main chamber 25 may be narrowed and the second main chamber 26 may be widened.

The main body 21 may be opened at a first end 21a and a second end 21b. The first end 21a of the main body 21 may be fully opened, and the second end 21b of the main body 21 may be opened only at a central portion thereof. A first end 23a of the rod 23 may be inserted into the opened second end 21b of the main body 21. The first end 23a of the rod 23 may be connected with the main piston 22 inside the main body 21. The rod 23 may be formed integrally with the main piston 22.

A diameter of the main piston 22 may be greater than a diameter of the rod 23, and a diameter of the rod 23 may be less than a diameter of the main piston 22.

The second end 23b of the rod 23 may protrude from second end 21b of the main body 21. An actuator 50, which allows the rod 23 to rectilinearly move, may be installed at the protruding second end 23b of the rod 23.

The actuator 50 may include the motor 52, a female screw 54, and a male screw 56 which may convert the rotational motion of the motor 52 into a rectilinear motion to allow the rod 23 to rectilinearly move. Screw threads may be formed on an inner circumferential surface of the female screw 54. The female screw 54 may be coupled to an end of the rod 23.

Screw threads, which are engaged with the screw threads of the female screw 54, may be formed on an outer circumferential surface of the male screw 56, and the male screw 56 may be inserted into the female screw 54. The male screw 56 may be connected with a rotor shaft of the motor 52, and may rotate together with the rotor shaft of the motor 52 when the rotor shaft of the motor 52 is rotated, thereby allowing the female screw 54, the rod 23, and the main piston 22 to rectilinearly move.

A second end of the main stopper 24 may be inserted and disposed into the first end 21a of the main body 21, such that the first end 21a of the main body 21 may be closed by the main stopper 24. A first end of the main stopper 24 may be exposed outside from the main body 21. The first end of the main stopper may be flush with and/or protrude from the first end 21a of the main body 21. The first end 21a of main body 21 may protrude away from first end 24a of the main stopper 24 opposite from the second end 21b of the main body 21.

The main piston 22 may be installed in the internal space in the main body 21 so as to be rectilinearly movable, and in a state in which the main piston 22 may be in close contact with an inner wall of the main body 21. A center portion of an outer circumferential surface of the main piston 22 may be in close contact with the inner wall of the main body 21, and the first end 22a and the second end 22b of the outer circumferential surface of the main piston 22 may be disposed to be spaced apart from the inner wall of the main body 21. A central portion of the main piston 22 may be formed in a hollow shape, and a central portion of the rod 23 may be also formed in a hollow shape. The male screw 56 may penetrate the female screw 54, and the first end of the male screw 56 may be disposed in the rod 23. The main stopper 24 may penetrate the main piston 22, and a second end of the main stopper 24 may be inserted and disposed into the rod 23.

While the main piston 22 and the rod 23 may be disposed in the first main chamber 25, the rod 23 may not be disposed in the second main chamber 26. Only the main piston 22 may be disposed in the second main chamber 26. An effective cross section of the second main chamber 26, which may compress brake fluid in the second main chamber 26 when the main piston 22 moves forward (i.e., towards the main stopper 24), may be greater than an effective cross section of the first main chamber 25, which may compress brake fluid in the first main chamber 25 when the main piston 22 moves rearward (i.e., away from the main stopper 24).

The wheel brakes 31, 32, 33, and 34 will be described below.

In exemplary embodiments, the wheel brakes 31, 32, 33, and 34 include a first wheel brake 31, which brakes a front left wheel of the automobile, a second wheel brake 32, which brakes a rear right wheel of the automobile, a third wheel brake 33, which brakes a rear left wheel of the automobile, and a fourth wheel brake 34, which brakes a front right wheel of the automobile.

A coupling relationship among the back-up master cylinder 10, the main master cylinder 20, and the wheel brakes 31, 32, 33, and 34, which are configured as described above, will be described below.

The first wheel brake 31 and the second wheel brake 32 may be connected through a first brake flow path 61. One end of the first brake flow path 61 may be connected to the first wheel brake 31, and the other end of the first brake flow path 61 may be connected to the second wheel brake 32.

A first inlet valve 81 and a second inlet valve 82, which open and close the first brake flow path 61, may be installed in the first brake flow path 61. The first inlet valve 81 may be disposed to be adjacent to the first wheel brake 31, and the second inlet valve 82 may be disposed to be adjacent to the second wheel brake 32.

A check valve 81a, which prevents a reverse flow of the brake fluid, may be installed in the first inlet valve 81. A check valve 82a, which prevents a reverse flow of the brake fluid, may also be installed in the second inlet valve 82.

A first pressure sensor 3, which measures pressure of the brake fluid in the first brake flow path 61, may be installed in the first brake flow path 61. The first pressure sensor 3 may be installed in the first brake flow path 61 between the first inlet valve 81 and the second inlet valve 82.

One end of a first recovery flow path 62 may be connected to the first brake flow path 61 between the first wheel brake 31 and the first inlet valve 81. Further, the other end of the first recovery flow path 62 may be connected to the first brake flow path 61 between the second wheel brake 32 and the second inlet valve 82.

A first outlet valve 85 and a second outlet valve 86, which open and close the first recovery flow path 62, may be installed in the first recovery flow path 62. The first outlet valve 85 may be disposed to be adjacent to one end of the first recovery flow path 62, and the second outlet valve 86 may be disposed to be adjacent to the other end of the first recovery flow path 62.

The third wheel brake 33 and the fourth wheel brake 34 may be connected through a second brake flow path 63. One end of the second brake flow path 63 may be connected to the third wheel brake 33, and the other end of the second brake flow path 63 may be connected to the fourth wheel brake 34.

A third inlet valve 83 and a fourth inlet valve 84, which open and close the second brake flow path 63, may be installed in the second brake flow path 63. The third inlet valve 83 may be disposed to be adjacent to the third wheel brake 33, and the fourth inlet valve 84 may be disposed to be adjacent to the fourth wheel brake 34.

A check valve 83a, which prevents a reverse flow of the brake fluid, may be installed in the third inlet valve 83. A check valve 84a, which prevents a reverse flow of the brake fluid, may be installed in the fourth inlet valve 84.

A second pressure sensor 4, which measures pressure of the brake fluid in the second brake flow path 63, may be installed in the second brake flow path 63. The second pressure sensor 4 may be installed in the second brake flow path 63 between the third inlet valve 83 and the fourth inlet valve 84.

One end of a second recovery flow path 64 may be connected to the second brake flow path 63 between the third wheel brake 33 and the third inlet valve 83. Further, the other end of the second recovery flow path 64 may be connected to the second brake flow path 63 between the fourth wheel brake 34 and the fourth inlet valve 84. A third outlet valve 87 and a fourth outlet valve 88, which open and close the second recovery flow path 64, may be installed in the second recovery flow path 64. The third outlet valve 87 may be disposed to be adjacent to one end of the second recovery flow path 64, and the fourth outlet valve 88 may be disposed to be adjacent to the other end of the second recovery flow path 64.

One end of a first main flow path 65 may be connected to the second main chamber 26. One end of the first main flow path 65 may be connected to the main body 21 so that the first main flow path 65 may be in communication with the second main chamber 26. The other end of the first main flow path 65 may be connected to the first brake flow path 61 between the first inlet valve 81 and the second inlet valve 82.

A first traction control valve 91, which opens and closes the first main flow path 65, may be installed in the first main flow path 65. The first traction control valve 91 may be a solenoid valve that opens and closes the first main flow path 65 by being controlled by the controller 40, and may be installed in the flow path through which hydraulic pressure in the second main chamber 26 may be supplied to the wheel brakes 31, 32, 33, and 34. A check valve 91a may be installed in the first traction control valve 91. The check valve 91a may be opened when the hydraulic pressure in the second main chamber 26 is a predetermined pressure or higher, thereby diverting the hydraulic pressure so that the hydraulic pressure in the second main chamber 26 may be supplied to the wheel brakes 31, 32, 33, and 34 when the first traction control valve 91 is closed.

One end of a second main flow path 66 may be connected to the first main chamber 25. One end of the second main flow path 66 may be connected to the main body 21 so that the second main flow path 66 may be in communication with the first main chamber 25. The other end of the second main flow path 66 may be connected to the second brake flow path 63.

A second traction control valve 92, which opens and closes the second main flow path 66, may be installed in the second main flow path 66. The second traction control valve 92 may be a solenoid valve that opens and closes the second main flow path 66 by being controlled by the controller 40, and may be installed in the flow path through which the hydraulic pressure in the first main chamber 25 may be supplied to the wheel brakes 31, 32, 33, and 34. A check valve 92a may be installed in the second traction control valve 92. The check valve 92a may be opened when the hydraulic pressure in the first main chamber 25 is a predetermined pressure or higher, thereby diverting the hydraulic pressure so that the hydraulic pressure in the first main chamber 25 may be supplied to the wheel brakes 31, 32, 33, and 34 when the second traction control valve 92 is closed.

One end of a mixing flow path 67 may be connected to the first main flow path 65 between the first traction control valve 91 and the first brake flow path 61. The other end of the mixing flow path 67 may be connected to the second main flow path 66 between the second traction control valve 92 and the second brake flow path 63. A mixing valve 93, which may open and close the mixing flow path 67, may be installed in the mixing flow path 67.

The first brake flow path 61, the second brake flow path 63, the first main flow path 65, and the mixing flow path 67 are flow paths through which the hydraulic pressure in the second main chamber 26 may be supplied to the wheel brakes 31, 32, 33, and 34. The first traction control valve 91 may be installed in the flow path through which the hydraulic pressure in the second main chamber 26 may be supplied to the wheel brakes 31, 32, 33, and 34.

The first brake flow path 61, the second brake flow path 63, the second main flow path 66, and the mixing flow path 67 are flow paths through which the hydraulic pressure in the first main chamber 25 may be supplied to the wheel brakes 31, 32, 33, and 34. The second traction control valve 92 may be installed in the flow path through which the hydraulic pressure in the first main chamber 25 may be supplied to the wheel brakes 31, 32, 33, and 34.

One end of a first back-up flow path 71 may be connected to the first back-up chamber 18, and the other end of the first back-up flow path 71 may be connected to the second back-up chamber 19. That is, one end of the first back-up flow path 71 may be connected to the back-up body 11 so that the first back-up flow path 71 may be in communication with the first back-up chamber 18, and the other end of the first back-up flow path 71 may be connected to the back-up body 11 so that the first back-up flow path 71 may be in communication with the second back-up chamber 19. A reservoir 100, which stores the brake fluid, may be installed in the first back-up flow path 71.

One end of a third recovery flow path 68 may be connected to the reservoir 100. The other end of the third recovery flow path 68 may be divided into two flow paths, such that one flow path may be connected to the first recovery flow path 62 between the first outlet valve 85 and the second outlet valve 86, and the other flow path may be connected to the second recovery flow path 64 between the third outlet valve 87 and the fourth outlet valve 88.

One end of the second back-up flow path 72 may be connected to the second back-up chamber 19. In other words, one end of the second back-up flow path 72 may be connected to the back-up body 11 so that the second back-up flow path 72 may be in communication with the second back-up chamber 19. The other end of the second back-up flow path 72 may be connected to the first back-up flow path 71 between the reservoir 100 and the back-up body 11.

A first back-up valve 94, which opens and closes the second back-up flow path 72, may be installed in the second back-up flow path 72. A check valve 94a, which prevents a reverse flow of the brake fluid, may be installed in the first back-up valve 94.

One end of a third back-up flow path 73 may be connected to the first back-up flow path 71 between the other end of the second back-up flow path 72 and the reservoir 100. The other end of the third back-up flow path 73 may be connected to the first main flow path 65. A check valve 5, which prevents a reverse flow of the brake fluid, may be installed in the third back-up flow path 73.

One end of a fourth back-up flow path 74 may be connected to the first back-up chamber 18. In other words, one end of the fourth back-up flow path 74 may be connected to the back-up body 11 so that the fourth back-up flow path 74 may be in communication with the first back-up chamber 18. Further, the other end of the fourth back-up flow path 74 may be connected to the first main chamber 25. In other words, the other end of the fourth back-up flow path 74 may be connected to the main body 21 so that the fourth back-up flow path 74 may be in communication with the first main chamber 25. A second back-up valve 95, which opens and closes the fourth back-up flow path 74, may be installed in the fourth back-up flow path 74. In addition, a check valve 6, which prevents a reverse flow of the brake fluid, may be installed in the fourth back-up flow path 74.

One end of a fifth back-up flow path 75 may be connected to the first back-up chamber 18. In other words, one end of the fifth back-up flow path 75 may be connected to the back-up body 11 so that the fifth back-up flow path 75 may be in communication with the first back-up chamber 18. Further, the other end of the fifth back-up flow path 75 may be connected to the fourth back-up flow path 74 between the second back-up valve 95 and the main body 21. A third back-up valve 96, which opens and closes the fifth back-up flow path 75, may be installed in the fifth back-up flow path 75. In addition, a third pressure sensor 7, which measures pressure of the brake fluid in the fifth back-up flow path 75, may be installed in the fifth back-up flow path 75. The third pressure sensor 7 may be installed in the fifth back-up flow path 75 between the back-up body 11 and the third back-up valve 96.

One end of a sixth back-up flow path 76 may be connected to the second back-up chamber 19. In other words, one end of the sixth back-up flow path 76 may be connected to the back-up body 11 so that the sixth back-up flow path 76 may be in communication with the second back-up chamber 19. The other end of the sixth back-up flow path 76 may be connected to the first main flow path 65 between one end of the first main flow path 65 and the other end of the third back-up flow path 73. A fourth back-up valve 97, which opens and closes the sixth back-up flow path 76, may be installed in the sixth back-up flow path 76.

The first inlet valve 81, second inlet valve 82, third inlet valve 83, the fourth inlet valve 84, the first outlet valve 85, second outlet valve 86, third outlet valve 87, the fourth outlet valve 88, the first traction control valve 91, the second traction control valve 92, the mixing valve 93, the first back-up valve 94, second back-up valve 95, third back-up valve 96, and the fourth back-up valve 97 are configured as solenoid valves controlled by the controller 40.

The first inlet valve 81, the second inlet valve 82, the third inlet valve 83, and the fourth inlet valve 84 may be formed as a normal open type in which the first inlet valve 81, the second inlet valve 82, the third inlet valve 83, and the fourth inlet valve 84 are opened at times when a control signal is not inputted from the controller 40.

The first outlet valve 85, the second outlet valve 86, the third outlet valve 87, and the fourth outlet valve 88 may be formed as a normal closed type in which the first outlet valve 85, the second outlet valve 86, the third outlet valve 87, and the fourth outlet valve 88 are closed at times when a control signal is not inputted from the controller 40.

The first traction control valve 91 and the second traction control valve 92 may be formed as a normal open type in which the first traction control valve 91 and the second traction control valve 92 are opened at times when a control signal may be not inputted from the controller 40. Further, the mixing valve 93 may be formed as a normal closed type in which the mixing valve 93 is closed at times when a control signal is not inputted from the controller 40.

The first back-up valve 94 may be formed as a normal closed type in which the first back-up valve 94 is closed at normal times when a control signal is not inputted from the controller 40. Further, the second back-up valve 95, the third back-up valve 96, and the fourth back-up valve 97 may be formed as a normal open type in which the second back-up valve 95, the third back-up valve 96, and the fourth back-up valve 97 are opened at normal times when a control signal is not inputted from the controller 40.

A method of controlling a conventional brake system (CBS) of the brake system for an automobile according to the exemplary embodiment of the present disclosure will be described below.

When the brake for an automobile is controlled by the controller 40, the controller 40 closes the second back-up valve 95, the third back-up valve 96, and the fourth back-up valve 97. Then, all of the first, second, third, and fourth back-up valves 94, 95, 96, and 97 are closed, such that the flow paths between the back-up master cylinder 10 and the main master cylinder 20 are shut off. In this case, the wheel brakes 31, 32, 33, and 34 generate braking force only by the hydraulic pressure supplied from the main master cylinder 20.

In this case, when electric power is not supplied to the controller 40, the second back-up valve 95, the third back-up valve 96, and the fourth back-up valve 97 are maintained in the opened state because the second back-up valve 95, the third back-up valve 96, and the fourth back-up valve 97 are normal open type valves.

Therefore, when the driver presses the brake pedal 1 when electric power is not supplied to the controller 40, hydraulic pressure, which may be formed in the first back-up chamber 18 by the brake fluid supplied from the reservoir 100, may be supplied to the first main chamber 25 through the fifth back-up flow path 75. In this case, since the fourth back-up flow path 74 may be opened by the second back-up valve 95, the first main chamber 25 may be maintained in an atmospheric pressure state, such that hydraulic pressure in the first back-up chamber 18 may be smoothly supplied to the first main chamber 25 through the fifth back-up flow path 75.

When the driver presses the brake pedal 1 in a state in which electric power is not supplied to the controller 40, hydraulic pressure, which may be formed in the second back-up chamber 19 by the brake oil supplied from the reservoir 100, may be supplied to the second main chamber 26 through the sixth back-up flow path 76.

As described above, according to the brake system for an automobile according to an exemplary embodiment, in a case in which electric power is not supplied to the controller 40 and the motor 52 is not operated, the back-up master cylinder 10 supplies the brake fluid to the main master cylinder 20, such that the main master cylinder 20 may generate sufficient hydraulic pressure to operate the wheel brakes 31, 32, 33, and 34 even though the motor 52 may be not operate. In addition, a manual bleeding operation, which discharges air from the inside of the main body 21, may be carried out without using a separate device.

A method of controlling an anti-lock brake system (ABS) of the brake system for an automobile according to an exemplary embodiment will be described below.

The brake system for an automobile according an exemplary embodiment increases or decreases the hydraulic pressure sent to the wheel brakes 31, 32, 33, and 34 in accordance with a speed of the respective wheels in order to improve rectilinear stability of the vehicle when the ABS is activated. Even when the ABS is activated, the controller 40 may operate the motor 52 in a state in which the back-up valves 94, 95, 96, and 97 are closed, thereby increasing or decreasing hydraulic pressure of the wheel brakes 31, 32, 33, and 34 by using the hydraulic pressure generated by the main master cylinder 20.

Unlike the control of a CBS, when the ABS is activated, the brake fluid may be discharged from a wheel brake (e.g., the second wheel brake 32), the wheel brake's hydraulic pressure may be decreased, and the brake fluid collected into the reservoir 100. In order to consistently increase and decrease hydraulic pressure, the main piston 22 connected to the motor 52 may reciprocate a given displacement to supplement the brake fluid used by the corresponding second wheel brake 32.

In an exemplary embodiment, because the effective cross section of the first main chamber 25 may be less than the effective cross section of the second main chamber 26, and the effective cross section of the second main chamber 26 may be greater than the effective cross section of the first main chamber 25, the first traction control valve 91 and the second traction control valve 92 are controlled differently when the main piston 22 moves forward and rearward, such that the number of times of changing the direction of the main piston 22 (the number of reciprocating motion) may be decreased, thereby improving ABS efficiency and durability of the main master cylinder 20, and reducing operational noise.

In particular, in the present exemplary embodiment, there may be a case in which the main piston 22 moves forward in a state in which both of the first traction control valve 91 and the second traction control valve 92 are closed, such that hydraulic pressure in the second main chamber 26 may be increased, and a case in which the main piston 22 moves forward in a state in which the first traction control valve 91 may be closed and the second traction control valve 92 may be opened, such that hydraulic pressure in the second main chamber 26 may be increased. Further, the main piston 22 moves rearward in a state in which both of the first traction control valve 91 and the second traction control valve 92 are closed, such that hydraulic pressure in the first main chamber 25 may be increased. Hereinafter, the case in which the main piston 22 moves forward in a state in which both of the first traction control valve 91 and the second traction control valve 92 are closed, such that hydraulic pressure in the second main chamber 26 may be increased is referred to as low-pressure forward movement connection control, the case in which the main piston 22 moves forward in a state in which the first traction control valve 91 is closed and the second traction control valve 92 is opened, such that hydraulic pressure in the second main chamber 26 may be increased is referred to as high-pressure forward movement connection control, and the case in which the main piston 22 moves rearward in a state in which both of the first traction control valve 91 and the second traction control valve 92 are closed, such that hydraulic pressure in the first main chamber 25 may be increased is referred to as high-pressure rearward movement connection control.

The controller 40 may perform the low-pressure forward movement connection control, the high-pressure forward movement connection control, and the high-pressure rearward movement connection control by considering the ABS starting pressure and a wheel control target maximum pressure. The wheel control target maximum pressure may be set to the current pressure of the wheel brakes 31, 32, 33, and 34 when the ABS is operated, and the wheel control target maximum pressure of the respective wheel brakes 31, 32, 33, and 34 may be updated each time pressure in the wheel brakes 31, 32, 33, and 34 is increased. In addition, the wheel control target maximum pressure may be set to the maximum pressure of the respective wheel control target maximum pressure of the wheel brakes 31, 32, 33, and 34, and updated each time the maximum pressure is changed. If the increased pressure is greater than the maximum pressure of the wheel brakes 31, 32, 33, and 34, the increased pressure may be updated as the wheel control target maximum pressure. After the ABS operation ends, the wheel control target maximum pressure and the maximum pressure may be initialized to 0.

A method of controlling the brake system for an automobile according tan exemplary embodiment will be described below with reference to FIG. 5, and prior to the description, a flow of hydraulic pressure at the time of the low-pressure forward movement connection control, the high-pressure forward movement connection control, and the high-pressure rearward movement connection control will be described with reference to FIGS. 2 to 4.

Figure 2:
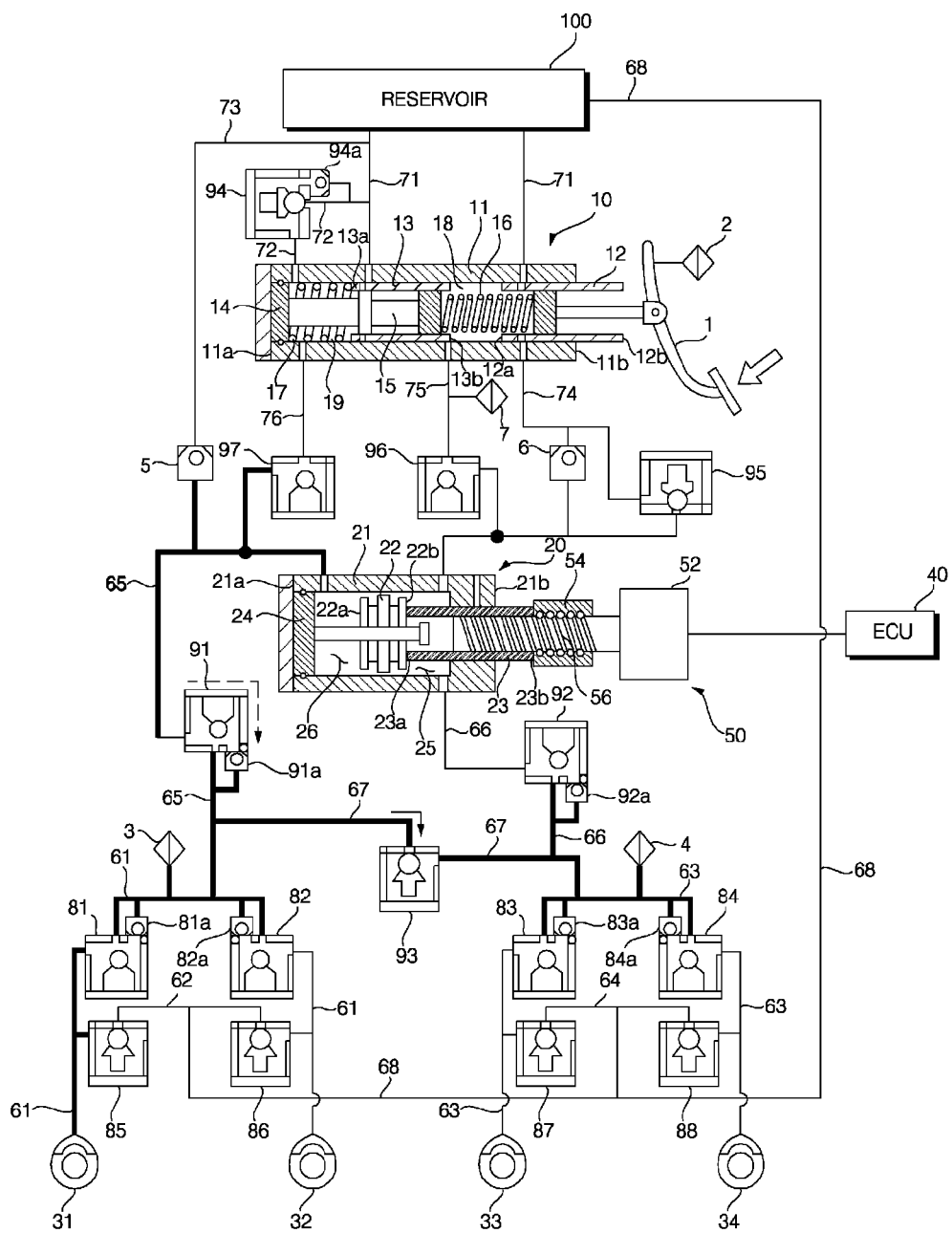
FIG. 2 is a view illustrating a flow of hydraulic pressure at the time of low-pressure forward movement connection control when an ABS is operated in the brake system for an automobile according to an exemplary embodiment.

FIG. 2 is a view illustrating a flow of hydraulic pressure at the time of the low-pressure forward movement connection control when the ABS is operated in the brake system for an automobile according to the exemplary embodiment of the present disclosure.

Referring to FIG. 2, at the time of the low-pressure forward movement connection control, the controller 40 closes the first traction control valve 91 and second traction control valve 92, operates the motor 52, and moves the main piston 22 forward, thereby increasing hydraulic pressure in the second main chamber 26. In this state, the back-up valves 94, 95, 96, and 97 and the inlet valves 81, 82, 83, and 84 are closed by being controlled by the controller 40, and the mixing valve 93 is opened by being controlled by the controller 40.

When pressure in the second main chamber 26 is a predetermined pressure or higher, the hydraulic pressure, which may be supplied to the first main flow path 65 from the second main chamber 26, may be diverted by the check valve 91*a* installed in the first traction control valve 91, such that a part of the hydraulic pressure may be moved to the first brake flow path 61, and the remaining part of the hydraulic pressure may be moved to the mixing flow path 67. The hydraulic pressure, which may be moved to the mixing flow path 67, may also be moved to the second brake flow path 63 via the second main flow path 66.

Thereafter, the controller 40 may open inlet valves 81, 82, 83, or 84 to supply hydraulic pressure to the corresponding wheel brake, of which pressure is to be increased among the wheel brakes 31, 32, 33, and 34, thereby increasing the pressure of the corresponding wheel brake (e.g., the controller 40 may open inlet valve 81 to supply hydraulic pressure to the first wheel brake 31). The controller 40 may open the corresponding outlet valves 85, 86, 87, and 88 to send hydraulic pressure to the reservoir 100 from the wheel brake requiring a decrease in pressure (e.g., the controller 40 may open outlet valve 86 to send hydraulic pressure to reservoir 100 from the second wheel brake 32). The controller 40 may also close the corresponding inlet valves 81, 82, 83, and 84 and corresponding outlet valves 85, 86, 87, and 88 for the wheel brake requiring the maintenance of the hydraulic pressure (e.g., inlet valve 84 and outlet valve 88 may be closed to maintain the hydraulic pressure of the fourth wheel brake 34).

In comparison with the high-pressure forward movement connection control to be described with reference to FIG. 3, the low-pressure forward movement connection control may discharge a large amount of brake fluid, and as a result, the low-pressure forward movement connection control may be appropriate for an ABS control situation on a low-friction road surface where the pressure requirements of the wheel brakes 31, 32, 33, and 34 may be relatively low.

Figure 3:
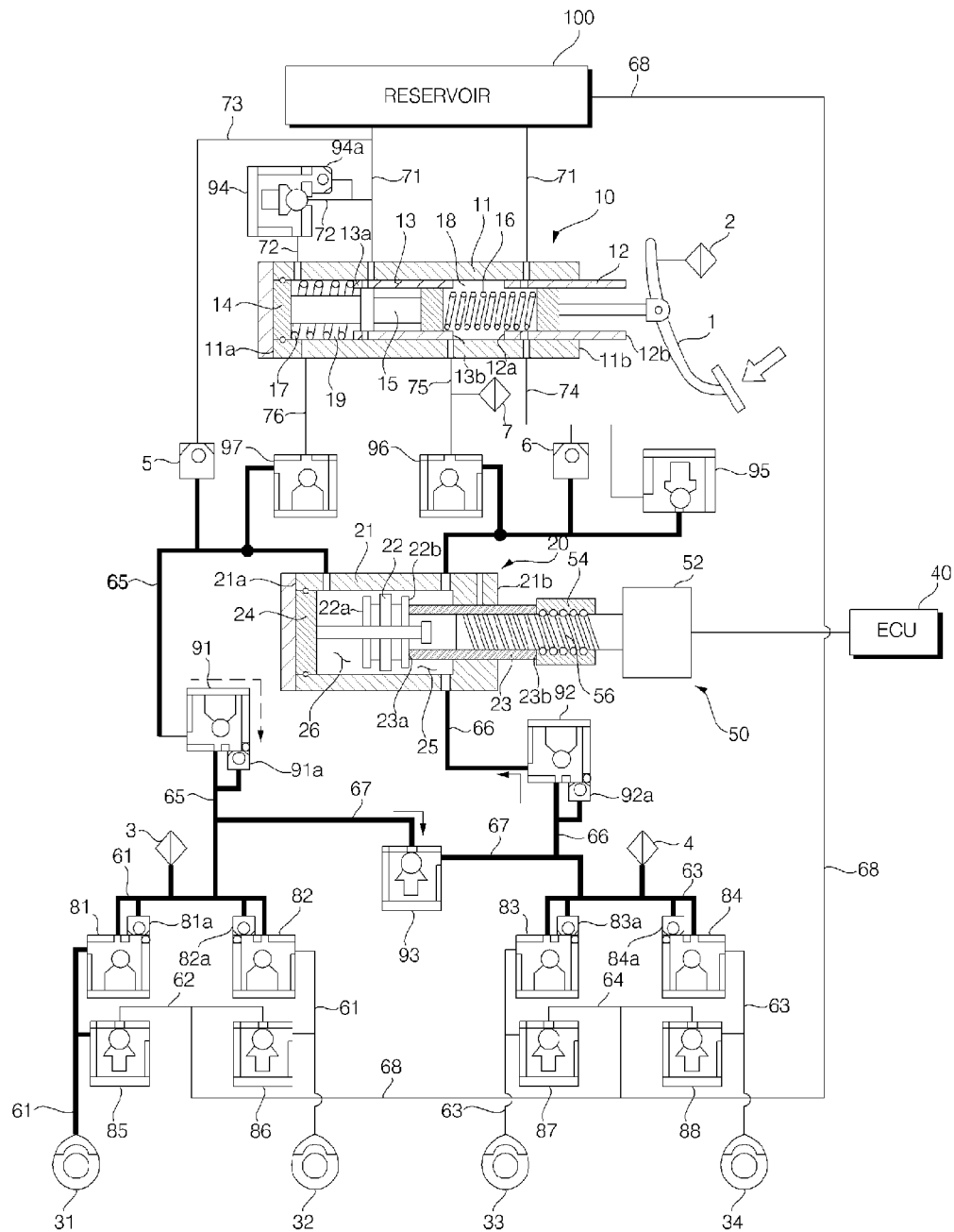
FIG. 3 is a view illustrating a flow of hydraulic pressure at the time of high-pressure forward movement connection control when an ABS is operated in the brake system for an automobile according to an exemplary embodiment.

FIG. 3 is a view illustrating a flow of hydraulic pressure at the time of the high-pressure forward movement connection control when the ABS is operated in the brake system for an automobile according to an exemplary embodiment.

Referring to FIG. 3, at the time of the high-pressure forward movement connection control, the controller 40 closes the first traction control valve 91, opens the second traction control valve 92, and then operates the motor 52 to move the main piston 22 forward, thereby increasing hydraulic pressure in the second main chamber 26. In this state, all of the back-up valves 94, 95, 96, and 97 and the inlet valves 81, 82, 83, and 84 are closed by being controlled by the controller 40, and the mixing valve 93 is opened by being controlled by the controller 40.

When pressure in the second main chamber 26 is a predetermined pressure or higher, the hydraulic pressure, which may be supplied to the first main flow path 65 from the second main chamber 26, may be diverted by the check valve 91*a* installed in the first traction control valve 91, such that a part of the hydraulic pressure may be moved to the first brake flow path 61 and the remaining part of the hydraulic pressure may be moved to the mixing flow path 67. The hydraulic pressure, which is moved to the mixing flow path 67, passes through the second main flow path 66. A part of the hydraulic pressure may be moved to the second brake flow path 63, and the remaining part of the hydraulic pressure may be moved to the first main chamber 25 via the second traction control valve 92.

Thereafter, the controller 40 may open inlet valves 81, 82, 83, or 84 to supply hydraulic pressure to the corresponding wheel brake, of which pressure is to be increased among the wheel brakes 31, 32, 33, and 34, thereby increasing the pressure of the corresponding wheel brake (e.g., the controller 40 may open inlet valve 81 to supply hydraulic pressure to the first wheel brake 31). The controller 40 may open the corresponding outlet valves 85, 86, 87, and 88 to send hydraulic pressure to the reservoir 100 from the wheel brake requiring a decrease in pressure (e.g., the controller 40 may open outlet valve 86 to send hydraulic pressure to reservoir 100 from the second wheel brake 32). The controller 40 may also close the corresponding inlet valves 81, 82, 83, and 84 and corresponding outlet valves 85, 86, 87, and 88 for the wheel brake requiring the maintenance of the hydraulic pressure (e.g., inlet valve 84 and outlet valve 88 may be closed to maintain the hydraulic pressure of the fourth wheel brake 34).

In comparison with the low-pressure forward movement connection control that has been described with reference to FIG. 2, the high-pressure forward movement connection control may be appropriate for an ABS control situation on a high-friction road surface where the pressure requirements of the wheel brakes 31, 32, 33, and 34 may be relatively high.

Figure 4:
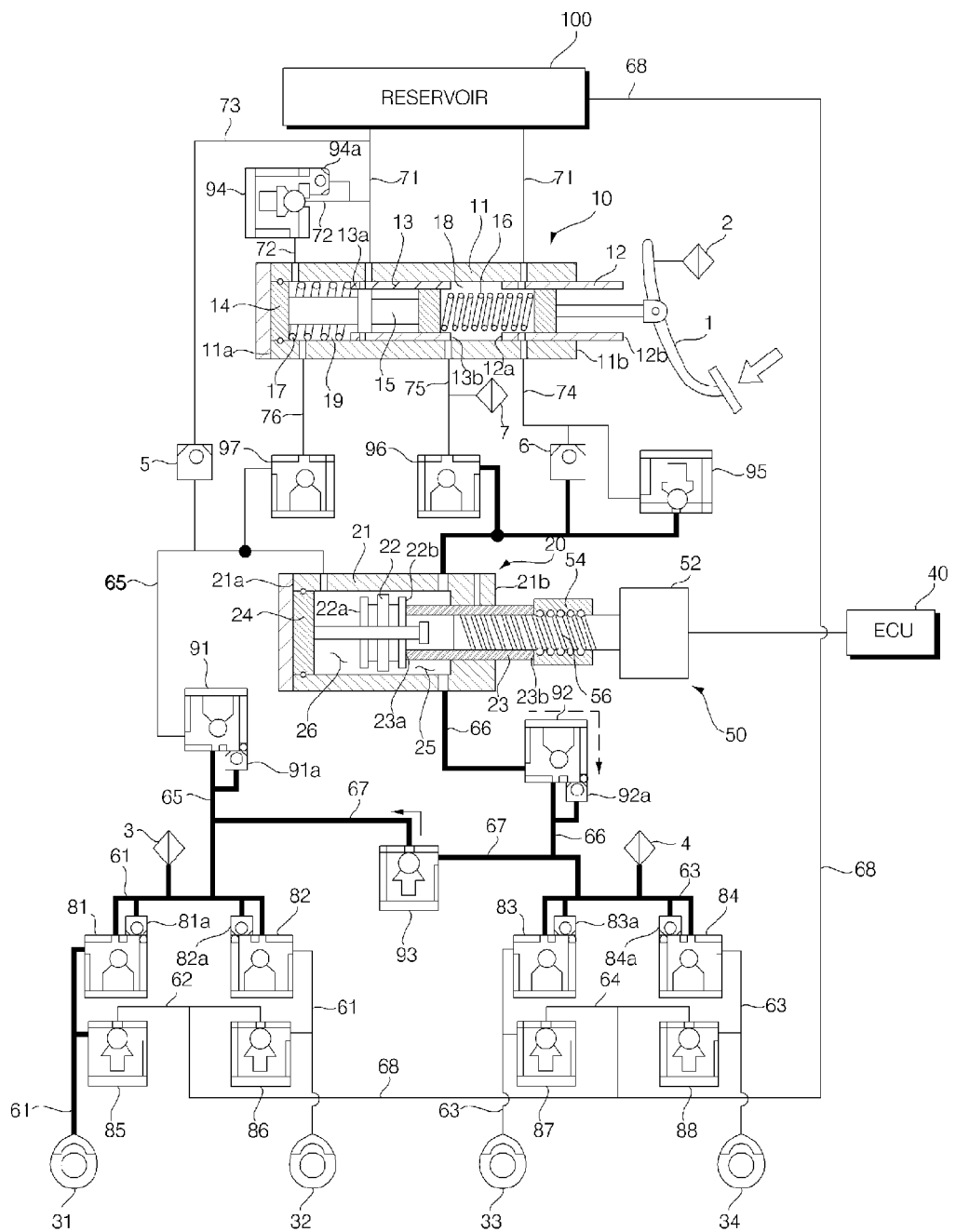
FIG. 4 is a view illustrating a flow of hydraulic pressure at the time of high-pressure rearward movement connection control when an ABS is operated in the brake system for an automobile according to an exemplary embodiment.

FIG. 4 is a view illustrating a flow of hydraulic pressure at the time of the high-pressure rearward movement connection control when the ABS is operated in the brake system for an automobile according to an exemplary embodiment.

Referring to FIG. 4, at the time of the high-pressure rearward movement connection control, the controller 40 closes the first traction control valve 91 and second traction control valve 92, and operates the motor 52 to move the main piston 22 rearward, thereby increasing hydraulic pressure of the first main chamber 25. In this state, all of the back-up valves 94, 95, 96, and 97 and the inlet valves 81, 82, 83, and 84 are closed by being controlled by the controller 40, and the mixing valve 93 may be opened by being controlled by the controller 40.

When pressure in the first main chamber 25 is a predetermined pressure or higher, the hydraulic pressure, which may be supplied to the second main flow path 66 from the first main chamber 25, may be diverted by the check valve 92*a* installed in the second traction control valve 92, such that a part of the hydraulic pressure may be moved to the second brake flow path 63, and the remaining part of the hydraulic pressure may be moved to the mixing flow path 67. The hydraulic pressure, which is moved to the mixing flow path 67, may also be moved to the first brake flow path 61 via the first main flow path 65.

Thereafter, the controller 40 may open inlet valves 81, 82, 83, or 84 to supply hydraulic pressure to the corresponding wheel brake, of which pressure is to be increased among the wheel brakes 31, 32, 33, and 34, thereby increasing the pressure of the corresponding wheel brake (e.g., the controller 40 may open inlet valve 81 to supply hydraulic pressure to the first wheel brake 31). The controller 40 may open the corresponding outlet valves 85, 86, 87, and 88 to send hydraulic pressure to the reservoir 100 from the wheel brake requiring a decrease in pressure (e.g., the controller 40 may open outlet valve 86 to send hydraulic pressure to reservoir 100 from the second wheel brake 32). The controller 40 may also close the corresponding inlet valves 81, 82, 83, and 84 and corresponding outlet valves 85, 86, 87, and 88 for the wheel brake requiring the maintenance of the hydraulic pressure (e.g., inlet valve 84 and outlet valve 88 may be closed to maintain the hydraulic pressure of the fourth wheel brake 34).

As described above, the controller 40 performs the low-pressure forward movement connection control, the high-pressure forward movement connection control, and the high-pressure rearward movement connection control by using the ABS starting pressure and the wheel control target maximum pressure, which will be described below in detail with reference to FIG. 5.

A method of controlling the brake system for an automobile according to the exemplary embodiment of the present disclosure will be described below with reference to FIG. 5.

Figure 5:
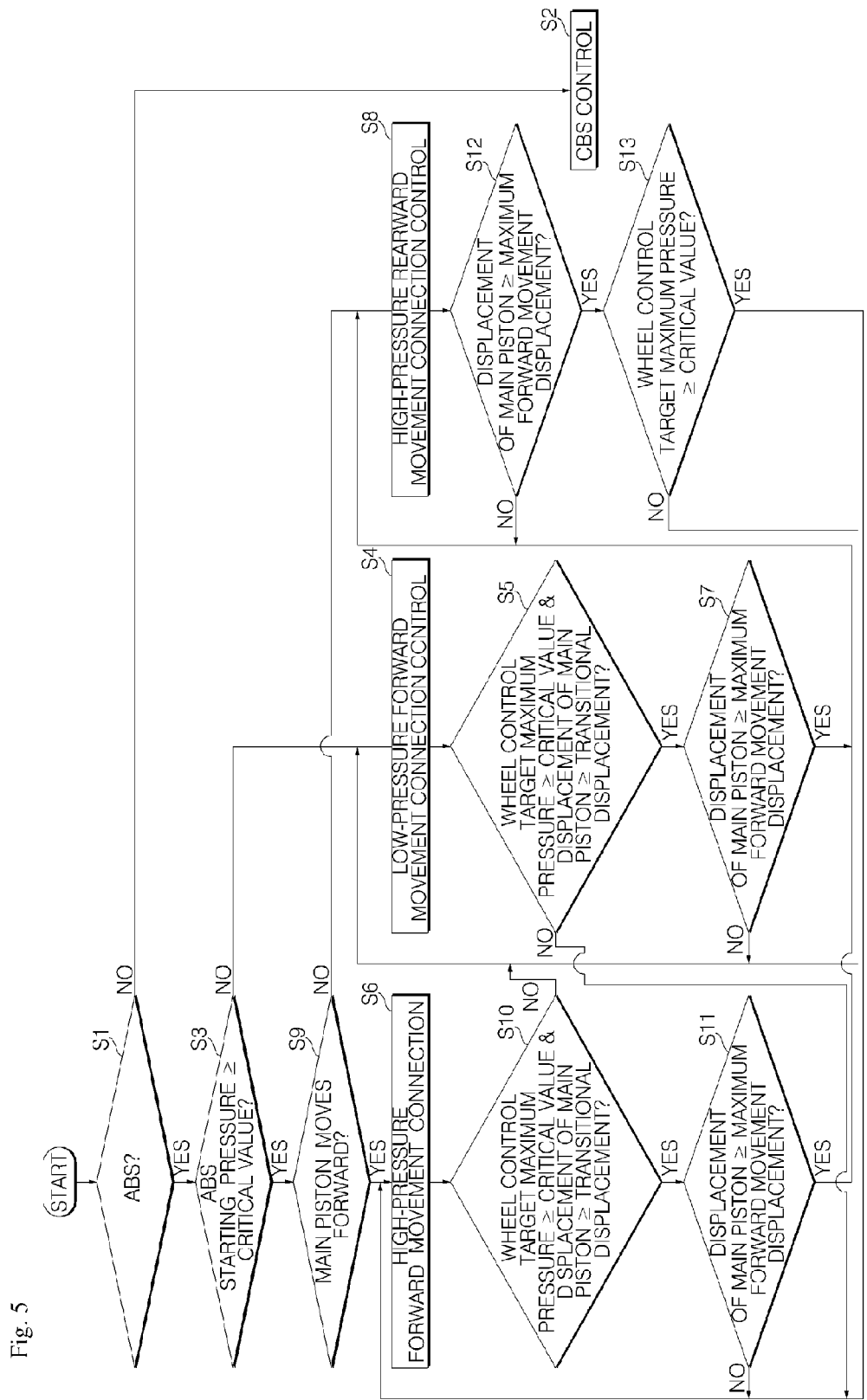
FIG. 5 is a flowchart illustrating a method of controlling the brake system for an automobile according to an exemplary embodiment.

FIG. 5 is a flowchart illustrating a method of controlling the brake system for an automobile according to an exemplary embodiment.

First, when the driver presses the brake pedal 1, the controller 40 determines whether ABS control may be required (S1). The controller 40 may determine whether the current situation may be a situation in which the ABS control may be required, by using a slip rate of a wheel and a speed of a wheel.

When the controller 40 determines that the ABS control may be not required, the controller 40 may perform the CBS control (S2).

When the controller 40 determines that the ABS control may be required, the controller 40 may determine whether the ABS starting pressure is a predetermined critical value or higher (S3).

When the ABS starting pressure is less than the predetermined critical value (i.e., determination block S3=NO), the controller 40 may perform the low-pressure forward movement connection control (S4). In particular, the controller 40 may close the first traction control valve 91 and the second traction control valve 92, and may move the main piston 22 forward, thereby increasing hydraulic pressure in the second main chamber 26.

Thereafter, while the main piston 22 moves forward, the controller 40 may determine whether the wheel control target maximum pressure greater than or equal to the critical value, and whether the displacement of the main piston 22 is greater than or equal to a predetermined transitional displacement (S5). The transitional displacement may be set to a position of the main piston 22 before the main piston 22 maximally moves forward, or may be set to a position where the main piston 22 has maximally moved forward and the direction of the main piston 22 is about to be changed.

When either the wheel control target maximum pressure is lower than the critical value or the displacement of the main piston 22 is less than the transitional displacement (i.e., determination block S5=NO), the controller 40 may perform the high-pressure forward movement connection control (S6). In particular, the controller 40 may close the first traction control valve 91, and may open the second traction control valve 92 to move the main piston 22 forward, thereby increasing hydraulic pressure in the second main chamber 26.

While the main piston 22 moves forward, the controller 40 may determine whether the displacement of the main piston 22 is a predetermined maximum forward movement displacement or greater (S7). Here, the maximum forward movement displacement may be set to a position where the main piston 22 is maximally moved forward.

When the displacement of the main piston 22 is the maximum forward movement displacement or greater (i.e. determination block S7=YES), the controller 40 may perform the high-pressure rearward movement connection control (S8). In particular, the controller 40 may close the first traction control valve 91 and the second traction control valve 92, and may move the main piston 22 rearward, thereby increasing hydraulic pressure in the first main chamber 25. When the displacement of the main piston 22 is less than the maximum forward movement displacement (i.e., determination block S7=NO), the controller 40 may continuously perform the low-pressure forward movement connection control (S4).

In step S3, when the ABS starting pressure is the critical value or higher (i.e., determination block S3=YES), the controller 40 may determine whether the main piston 22 is in the direction in which the main piston 22 moves forward (S9).

When the ABS starting pressure is the critical value or higher (i.e., determination block S3=YES), and the main piston 22 is moving forward (i.e., determination block S9=YES), the controller 40 may perform the high-pressure forward movement connection control (S6). In particular, the controller 40 may close the first traction control valve 91, and may open the second traction control valve 92 to move the main piston 22 forward, thereby increasing hydraulic pressure in the second main chamber 26.

Thereafter, while the main piston 22 moves forward, the controller 40 may determine whether the wheel control target maximum pressure is the critical value or higher, and the displacement of the main piston 22 is the transitional displacement or greater (S10).

When either the wheel control target maximum pressure is lower than the critical value or the displacement of the main piston 22 is less than the transitional displacement (i.e., determination block S10=NO), the controller 40 may perform the low-pressure forward movement connection control (S4). In particular, the controller 40 may close the first traction control valve 91 and the second traction control valve 92, and moves the main piston 22 forward, thereby increasing hydraulic pressure in the second main chamber 26.

When the main piston 22 moves forward (i.e., determination block S9=YES), the wheel control target maximum pressure is the critical value or higher, and the displacement of the main piston 22 is the transitional displacement or greater (i.e., determination block S10=YES), the controller 40 may determine whether the displacement of the main piston 22 is the maximum forward movement displacement or greater (S11).

When the displacement of the main piston 22 is the maximum forward movement displacement or greater (i.e., determination block S11=YES), the controller 40 may perform the high-pressure rearward movement connection control (S8). In particular, the controller 40 may close the first traction control valve 91 and the second traction control valve 92, and moves the main piston 22 rearward, thereby increasing hydraulic pressure in the first main chamber 25. When the displacement of the main piston 22 is less than the maximum forward movement displacement (i.e., determination block S11=NO), the controller 40 may continuously perform the high-pressure forward movement connection control (S6).

When the ABS starting pressure is the critical value or higher in step S3 (i.e., determination block S3=YES) and the main piston 22 is not moving forward in step S9 (i.e., determination block S9=NO), the controller 40 may perform the high-pressure rearward movement connection control (S8). In particular, the controller 40 may close the first traction control valve 91 and the second traction control valve 92, thereby increasing hydraulic pressure in the first main chamber 25.

Thereafter, while the main piston 22 moves rearward, the controller 40 may determine whether the displacement of the main piston 22 is a predetermined maximum rearward movement displacement or less (S12). Here, the maximum rearward movement displacement may be set to a position where the main piston 22 is maximally moved rearward.

When the displacement of the main piston 22 is greater than the maximum rearward movement displacement (i.e., determination block S12=NO), the controller 40 continuously performs the high-pressure rearward movement connection control (S8).

When the displacement of the main piston 22 is the maximum rearward movement displacement or less (i.e., determination block S12=YES), the controller 40 may determine whether the wheel control target maximum pressure is the critical value or higher (S13).

When the displacement of the main piston 22 is the maximum rearward movement displacement or less (i.e. determination block S12=YES) and the wheel control target maximum pressure is lower than the critical value (i.e., determination block S13=NO), the controller 40 may perform the low-pressure forward movement connection control (S4). In particular, the controller 40 may close the first traction control valve 91 and the second traction control valve 92, and may move the main piston 22 forward, thereby increasing hydraulic pressure in the second main chamber 26.

When the displacement of the main piston 22 is the maximum rearward movement displacement or less (i.e., determination block S12=YES), and the wheel control target maximum pressure is the critical value or higher (i.e., determination block S13=YES), the controller 40 may perform the high-pressure forward movement connection control (S6). In particular, the controller 40 may close the first traction control valve 91, and may open the second traction control valve 92 to move the main piston 22 forward, thereby increasing hydraulic pressure in the second main chamber 26.

As described above, the brake system for automobile according exemplary embodiments performs the low-pressure forward movement connection control, the high-pressure forward movement connection control, and the high-pressure rearward movement connection control in an ABS situation, thereby reducing the number of reciprocating motion of the main piston 22, and improving ABS efficiency. In addition, it may be possible to prevent both ends of the main piston 22 from colliding with the main body 21 during the reciprocating motion of the main piston 22. As a result, it may be possible to improve durability of the main master cylinder 20 and prevent the occurrence of noise.

By performing the low-pressure forward movement connection control, the ABS efficiency may be improved on a low-friction road surface where the hydraulic pressure of the wheel brakes 31, 32, 33, and 34 needs to be low.

By performing the high-pressure forward movement connection control, the ABS efficiency may be improved on a high-friction road surface where the hydraulic pressure of the wheel brakes 31, 32, 33, and 34 needs to be high.

The controller 40 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, controller 40 and/or one or more components thereof may include or otherwise be associated with one or more memories (not shown) including code (e.g., instructions) configured to cause the controller 40 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A brake system for an automobile, comprising:
    a main body having an internal space divided by a main piston into a first main chamber and a second main chamber having a greater effective cross section than the first main chamber;
    a motor configured to:
        move the main piston forward such that the first main chamber is widened while the second main chamber is narrowed, and
        move the main piston rearward such that the first main chamber is narrowed while the second main chamber is widened;
    a first traction control valve installed in a first flow path through which a first hydraulic pressure in the second main chamber is supplied to first wheel brakes;

a second traction control valve installed in a second flow path through which a second hydraulic pressure in the first main chamber is supplied to second wheel brakes;

a first check valve configured to divert the first hydraulic pressure in the second main chamber to the first wheel brakes, is installed in the first traction control valve, a second check valve configured to divert the second hydraulic pressure in the first main chamber to the second wheel brakes, is installed in the second traction control valve; and a controller configured to control the motor, the first traction control valve, and the second traction control valve, wherein when an anti-lock brake system (ABS) starting pressure is lower than an ABS critical value, the controller performs a low-pressure forward movement connection control that closes the first traction control valve and the second traction control valve, and moves the main piston forward to increase the first hydraulic pressure in the second main chamber, wherein the ABS starting pressure is a pressure of at least one of the first wheel brakes and second wheel brakes when an ABS is started, wherein the ABS starting pressure is obtained from a sensor connected to one of the first flow path and the second flow path, and wherein while the main piston moves forward, when wheel control target maximum pressure for controlling the at least one of the first wheel brakes and second wheel brakes is the ABS critical value or higher, and a displacement of the main piston is less than a transitional displacement, the controller performs high-pressure forward movement connection control that closes the first traction control valve, and opens the second traction control valve to increase the first hydraulic pressure in the second main chamber.

2. The brake system of claim 1, wherein while the main piston moves forward, when a displacement of the main piston is a maximum forward movement displacement or greater, the controller performs high-pressure rearward movement connection control that closes the first traction control valve and the second traction control valve, and moves the main piston rearward to increase the second hydraulic pressure in the first main chamber.

3. The brake system of claim 1, wherein when the ABS starting pressure is the ABS critical value or higher and the main piston is moving forward, the controller performs high-pressure forward movement connection control that closes the first traction control valve, and opens the second traction control valve to increase the first hydraulic pressure in the second main chamber.

4. The brake system of claim 1, wherein while the main piston moves rearward, when a displacement of the main piston is a predetermined maximum rearward movement displacement or less, and wheel control target maximum pressure for controlling a wheel brake of at least one of the first and second wheel brakes is lower than a wheel control target critical value, the controller performs the low-pressure forward movement connection control.

5. The brake system of claim 1, wherein while the main piston moves rearward, when a displacement of the main piston is a predetermined maximum rearward movement displacement or less, and wheel control target maximum pressure for controlling the first or second wheel brakes is a wheel control target critical value or higher, the controller performs high-pressure forward movement connection control that closes the first traction control valve, opens the second traction control valve, and moves the main piston forward so as to increase the first hydraulic pressure in the second main chamber.

6. The brake system of claim 1, further comprising:

a first brake flow path which connects a first wheel brake and a second wheel brake among the first wheel brakes; a second brake flow path which connects a third wheel brake and a fourth wheel brake among the second wheel brakes; a first main flow path which connects the second main chamber and the first brake flow path; a second main flow path which connects the first main chamber and the second brake flow path; and a mixing flow path which connects the first main flow path and the second main flow path, wherein the first traction control valve is installed in the first main flow path, and the second traction control valve is installed in the second main flow path, wherein the first traction control valve is installed in the first main flow path, and the second traction control valve is installed in the second main flow path.

7. A brake system for an automobile, comprising:

a main body having an internal space divided by a main piston into a first main chamber and a second main chamber having a greater effective cross section than the first main chamber;

a motor configured to:

move the main piston forward such that the first main chamber is widened while the second main chamber is narrowed, and move the main piston rearward such that the first main chamber is narrowed while the second main chamber is widened;

a first traction control valve installed in a first flow path through which a first hydraulic pressure in the second main chamber is supplied to first wheel brakes;

a second traction control valve installed in a second flow path through which a second hydraulic pressure in the first main chamber is supplied to second wheel brakes;

a first check valve configured to divert the first hydraulic pressure in the second main chamber to the first wheel brakes, is installed in the first traction control valve, a second check valve configured to divert the second hydraulic pressure in the first main chamber to the second wheel brakes, is installed in the second traction control valve; and a controller configured to control the motor, the first traction control valve, and the second traction control valve, wherein when an anti-lock brake system (ABS) starting pressure is lower than an ABS critical value, the controller performs a low-pressure forward movement connection control that closes the first traction control valve and the second traction control valve, and moves the main piston forward to increase the first hydraulic pressure in the second main chamber, wherein the ABS starting pressure is a pressure of at least one of the first wheel brakes and second wheel brakes when an ABS is started, wherein the ABS starting pressure is obtained from a sensor connected to one of the first flow path and the second flow path, and wherein while the main piston moves forward, when a displacement of the main piston is a maximum forward movement displacement or greater, the controller performs high-pressure rearward movement connection control that closes the first traction control valve and the second traction control valve, and moves the main piston rearward to increase the second hydraulic pressure in the first main chamber.

8. The brake system of claim 7, wherein when the ABS starting pressure is the ABS critical value or higher and the main piston is moving rearward, the controller performs high-pressure rearward movement connection control that closes the first traction control valve and the second traction control valve, and increases the second hydraulic pressure in the first main chamber.

9. A brake system for an automobile, comprising:
a main body having an internal space divided by a main piston into a first main chamber and a second main chamber having a greater effective cross section than the first main chamber;
a motor configured to:
move the main piston forward such that the first main chamber is widened while the second main chamber is narrowed, and
move the main piston rearward such that the first main chamber is narrowed while the second main chamber is widened;
a first traction control valve installed in a first flow path through which a first hydraulic pressure in the second main chamber is supplied to first wheel brakes;
a second traction control valve installed in a second flow path through which a second hydraulic pressure in the first main chamber is supplied to second wheel brakes;
a first check valve configured to divert the first hydraulic pressure in the second main chamber to the first wheel brakes, is installed in the first traction control valve,
a second check valve configured to divert the second hydraulic pressure in the first main chamber to the second wheel brakes, is installed in the second traction control valve; and
a controller configured to control the motor, the first traction control valve, and the second traction control valve,
wherein when an anti-lock brake system (ABS) starting pressure is lower than an ABS critical value, the controller performs a low-pressure forward movement connection control that closes the first traction control valve and the second traction control valve, and moves the main piston forward to increase the first hydraulic pressure in the second main chamber,
wherein the ABS starting pressure is a pressure of at least one of the first wheel brakes and second wheel brakes when an ABS is started,
wherein the ABS starting pressure is obtained from a sensor connected to one of the first flow path and the second flow path, and
wherein while the main piston moves rearward, when a displacement of the main piston is a predetermined maximum rearward movement displacement or less, and wheel control target maximum pressure for controlling a wheel brake of at least one of the first and second wheel brakes is lower than a wheel control target critical value, the controller performs the low-pressure forward movement connection control.

10. The brake system of claim 9, wherein while the main piston moves forward, when wheel control target maximum pressure for controlling a wheel brake of at least one of the first and second wheel brakes is lower than a wheel control target critical value and a displacement of the main piston is lower than a predetermined transitional displacement, the controller performs the low-pressure forward movement connection control.

* * * * *